(No Model.)

J. S. VAN BUREN.
COOKING STOVE OR RANGE.

No. 353,992. Patented Dec. 7, 1886.

Witnesses.
L. F. Gardner
A. S. Pattison

Inventor
J. S. Van Buren,
per
F. A. Lehmann,
Atty.

UNITED STATES PATENT OFFICE.

JAFEW S. VAN BUREN, OF ALBANY, NEW YORK.

COOKING STOVE OR RANGE.

SPECIFICATION forming part of Letters Patent No. 353,992, dated December 7, 1886.

Application filed May 6, 1886. Serial No. 201,329. (No model.)

*To all whom it may concern:*

Be it known that I, JAFEW S. VAN BUREN, of Albany, in the county of Albany and State of New York, have invented certain new and useful Improvements in Cooking Stoves or Ranges; and I do hereby declare the following to be a full, clear, and exact description of the invention, such as will enable others skilled in the art to which it pertains to make and use it, reference being had to the accompanying drawings, which form part of this specification.

My invention relates to an improvement in cooking stoves or ranges; and it consists in the combination of the front fire-plate with a brace-bar, which is applied thereto for the purpose of preventing the front plate from warping, as will be more fully described hereinafter.

The object of my invention is to apply a brace-bar of suitable form to the outer side of the fire-plate for the purpose of preventing this plate from warping out of shape on account of the intense heat to which it is subjected.

Figure 1:
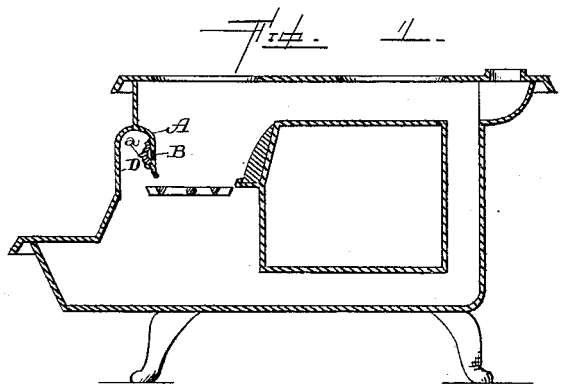
Figure 2:
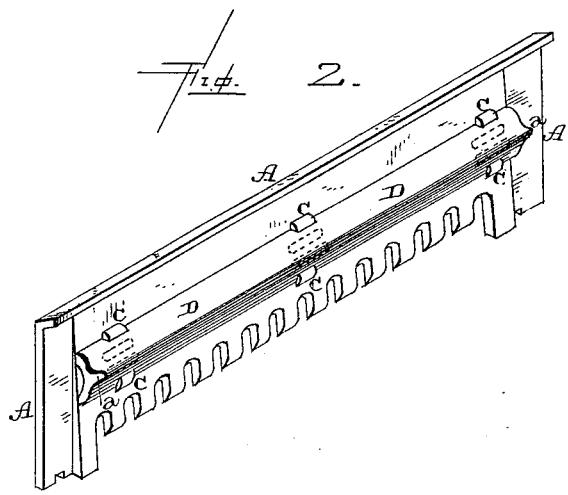

Figure 1 is a vertical section of a stove embodying my invention. Fig. 2 is a perspective of a fire-plate to which the brace-bar is connected.

A represents the front fire-plate, which is of ordinary construction, and which has a series of holes, B, formed through its upper edge. Upon the outer side of this plate are cast a suitable number of guides, C, between which the brace-bar D is placed, and which bar has an endwise movement in either direction, so that it can be readily attached to and removed from the plate whenever desired. This brace-bar is made nearly triangular in shape. Its inner side is made concave, thus forming a chamber, through which the air will flow and pass through the openings B in the plate A for the purpose of keeping the parts cool.

The bar D, provided with the strengthening-rib $a$ on its back, is made removable from the plate A, so that when the plate becomes burned out or broken the bar can be removed and applied to another plate. As the heat has no destroying effect upon the bar D it will outlast a number of plates. This brace-bar comes in contact with the plate only at its two inner edges, and as there is a current of air constantly flowing between the bar and plate this bar never becomes heated to such a great extent as the plate, and hence acts as a brace to prevent the plate from warping. Owing to the intense heat to which the plate is subjected, it soon warps out of shape to such an extent as to very seriously interfere with the operation of the stove, and hence it becomes necessary that some means should be applied thereto for the purpose of preventing this trouble. The bar D being made convex, and provided with a strengthening-rib along its outer side, will not allow the plate to warp, even should the bar itself become heated to a very high degree.

I do not limit myself to the particular means here shown of applying this bar to the outer side of the plate, for the bar may be held in place by other devices than the guiding-lugs here shown.

Having thus described my invention, I claim—

1. The combination of the fire-plate provided with a number of guides, C, with the brace-bar D, provided with a strengthening-rib, $a$, on its back, the bar being movable endwise, substantially as shown.

2. The combination of the fire-plate provided with openings for the passage of air, and provided with guides, with the brace-bar applied to the outer side of the plate, concave on its inner side to form an air-passage, and formed with an external strengthening-rib, substantially as described.

In testimony whereof I affix my signature in presence of two witnesses.

JAFEW S. VAN BUREN.

Witnesses:
WM. E. PALMER,
AMBROSE I. HENNESSY.